2,899,333
METHOD OF SILVERING MIRRORS

Robert E. Gee and James W. Gibbs, Philadelphia, Pa., assignors to Safetee Glass Company, Philadelphia, Pa., a corporation of Pennsylvania No Drawing. Application February 1, 1955
Serial No. 485,577

5 Claims. (Cl. 117—35)

This invention relates to the production of improved mirrored surfaces and, more particularly, to the production of improved mirrors resulting from an improved preparation of the surface to be silvered prior to the silvering operation.

In the conventional silvering processes heretofore employed, the following method steps are involved: First, the surface to be silvered is mechanically cleaned by rubbing with a suspension of a suitable rouge in water. Secondly, the surface is rinsed with distilled or demineralized water in order to remove any residual rouge. The surface is then "tinned" by spray, dip or wash with a solution of stannous chloride $SnCl_2 \cdot 2H_2O$. The tinning step is followed by a rinsing and, thereafter, the conventional silvering solutions are applied. The silvering solutions may be, for example, a solution containing silver nitrate and a reducing solution. Mirrors are also made by the reduction of a silver solution containing the ammonia complex $Ag(NH_3)_2$, by means of an organic reducing agent such as formaldehyde. The silver precipitation occurs in a few seconds to produce the mirror surface and then the solution is run and washed off.

The nature of the surface of glass makes it exceedingly difficult to clean to the extent required to properly prepare the surface for silvering. On a sub-microscopic scale, the surface of a sheet of glass contains many irregularities, ridges, pores, scratches and crystal discontinuities. Furthermore, glass because of its electrostatic nature tends to attract and hold dust particles. The pores, scratches and other sub-microscopic depressions in the surface of the glass become filled with impurities. Water and gases are absorbed in the impurities and also in the water, and serve to prevent proper silvering by leaving holes or streaks in the silver film due to the fact that the silvering solution passes over the mouth or opening of the depression and does not enter into the depression. Hence, a hole is formed in the silver surface except when a relatively heavy and opaque silver film is deposited.

A further difficulty arises due to the fact that in washing a glass surface the first layer of water molecules adjacent to the glass surface is practically immobile due to the absorption forces of the molecules in the surface of the glass and thus the water flows over the surface by the shearing of successive layers of water flowing over each other and the result is that the glass is protected by the first layer through which atoms and ions of cleaning solutions and of the silvering solution must penetrate if a good mirrored surface is to be produced. Thus to accomplish good cleaning, the cleaning agents carried by the wash water must be highly active and compatible with the material being washed.

These difficulties are particularly critical when the so-called half silvered mirrors are produced. In these mirrors only a limited amount of silver is deposited on the surface of the glass providing a mirror which reflects only a portion of the light striking the mirrored surface and permits the remainder of the light to pass through the surface and through the glass. In these thin or lightly mirrored surfaces blemishes and discontinuities in the silvered surface become extremely critical.

Many of the foregoing difficulties can be overcome by the use of a chemical cleaning or surface preparing step in place of the "tinning" step referred to in the method outlined above. The chemical cleaning step involves the use of titanous chloride in an aqueous solution either with or without the presence of stannous chloride.

A typical surface preparing or cleaning solution may be formed by adding 0.01 gram of titanous chloride to 4,000 ml. of distilled water. While this is the most desirable concentration of titanous chloride, a reasonably satisfactory solution may include from .002 to 0.1 gram of titanous chloride in 4,000 ml. of water. A less desirable but usable solution can be formed of as little as .0002 gram and as much as 0.2 gram of titanous chloride in 4,000 ml. of water. It will be noted that while the words "titanous chloride" generally refer to the trichloride, $TiCl_3$ in which the titanium has a valence of +3, however, the dichloride may also be included in the name "titanous chloride."

In any of the foregoing solutions, there is desirably employed additionally one gram of stannous chloride. While this is approximately the most desirable quantity of stannous chloride, a reasonably satisfactory solution may include from 0.2 gram to 10 grams of stannous chloride, and a less desirable but usable solution may include from .02 gram to 20 grams of stannous chloride.

From the foregoing it will be evident that the ratio of titanous chloride to stannous chloride desirably employed is in the order of 1 to 100.

As noted above, the tendency of the surface of glass is to retain within sub-microscopic irregularities therein various air-borne impurities such as, for example, $CO_2$, $SO_2$, $H_2S$, soot, dust and other solids, tar, oil, water and other liquids and semiliquids as well as numerous other materials which may become deposited on the glass surface. These impurities are more completely removed by the titanous ion for numerous reasons. The titanous ion is a more powerful reducing ion than the stannous ion. Thus it will reduce foreign matter and impurities which are untouched by the stannous ion. Furthermore, the titanous ion is a more powerful getter for dissolved and absorbed oxygen which is always present in water solutions and which is the cause of sludge or fog in the mirror surface particularly when the silver becomes slightly oxidized. The titanous ion is smaller than the stannous ion. For this reason it can penetrate absorbed layers of gas and water molecules and thereby perform its cleansing reducing work more efficiently.

While the foregoing discussion has been directed to the use of titanium chloride with or without the presence of stannous chloride in the cleaning of the glass surface prior to silvering, it will be noted that many of the advantages referred to above in connection with the use of titanium chloride may be found in connection with the use of compounds of elements in Group IV-A of the Mendeleeff Periodic Chart.

It addition to the foregoing, it will be noted that titanium is in the same group as silicon in the Mendeleeff Periodic Chart and is positioned therein immediately below silicon. This closeness of the titanium to silicon and the strong reducing nature of titanous chloride results in a highly effective cleaning and reducing action by the titanous ion for materials which are in intimate engagement with the silicon atoms or molecules in the glass.

Glass is generally recognized as formed of tetrahedra comprising the group $SiO_4$. The silicon atom is positioned at the center of the tetrahedron and the four corners of the tetrahedron are occupied by oxygen atoms. The oxygen atom may share the corner of an adjacent tetrahedron or may be attached to a sodium or calcium atom. Sodium and sometimes calcium and/or potassium are added to the $SiO_4$ in the manufacture of glass. Thus, at the surface of the glass there is provided a layer of atoms rich in sodium and sometimes additionally calcium and/or potassium. Each sodium atom is attached through an atom to the silicate structure.

When the surface of the glass is washed with a solution containing stannous ions, or stannous and titanous ions, a replacement of sodium ions by stannous or titanous ions occurs and replaced sodium ions are washed away with the chloride ions present in the solution. The surface of the glass is now dotted with stannous ions and also titanous ions if they were present in the solution. The stannous and titanous ions are firmly attached to the glass structure as a result of the ion exchange. The process of ion exchange is well known and need not be discussed herein in detail. It should be noted, however, that complete ionization is not reached until infinite dilution is obtained and thus the ion exchange takes place most effectively only when the stannous ions and titanous ions are present in minute quantities such as are involved in the proportion ranges noted above.

The ion excess of the elements in question is a factor in making titanium desirably employed. The titanium atom is smaller than the tin atom. While specific and accurate data on the ionic radii is not complete, it has been reported that in the fourth valence state Si is 0.39 to 0.44 angstrom units, Ti is 0.62 to 0.64, and Sn is 0.71 to 0.74 (Goldschmidt, Pauling, Zachariasen). For comparison, Na, at $+1$ is given at 0.95 to 0.98. Consequently, the smaller size of titanium permits it to penetrate the layer of sodium ions better than the tin ion and the same fact allows it to be assimilated more readily into the silicate structure.

The importance of this ion exchange is that the stannous and titanous ions are still in the reduced state and each can act as a nucleus or center for the starting of reduction of silver from the ammonical complex, $Ag(NH_3)_2$, on and firmly attached to the glass structure. These centers may then grow by the addition of flakelets of silver obtained from the reduction of the silvering solution by the reducing solution which is applied to the glass surface in conjunction with the application of the silvering solution. These centers of silver may grow until the glass surface is completely covered by an opaque silver coating, or the operation may be stopped at an earlier stage so that only a transparent mirror is obtained. It is believed probable that those stannous and titanous ions which became attached to the glass by the ion exchange process and which act as a nucleus or center for the starting of the reduction of silver remain in the film structure as anchor points for the silver coating. Those stannous and titanous ions which were washed away were, however, effective as reducing or cleansing agents.

At this point, it may be noted, without burdening the disclosure with a detailed description, that it is recognized that the titanous ion has a greater potential than has the stannous ion. It is additionally noted that the bond strength of the element silicon in connection with the oxygen atom resulting from the ion exchange process noted above is substantially greater than the bond strength of titanium, tin or sodium with oxygen. These bond strengths are on the order of 106 for silicon, 73 for titanium, 46 for tin and 20 for sodium. From the foregoing, it will be evident that the titanium is highly effective in replacing sodium atoms lying on a surface to be silver plated. This relatively high potential of the titanous ion and the greater bond strength of titanium in conjunction with the smaller size of the titanous ion when compared with tin and the stannous ion explain why the titanous ion is more effective in penetrating crevices and other discontinuities in the surface to be silvered and why the titanous ion adheres more firmly to a surface to be silvered.

It should be noted that complete and uniform cleaning of the glass surface provides for the disposition of these plates or platelets of silver in flat form on the surface of the glass. In other words, by having the glass surface substantially perfectly clean, substantially all of the platelets are believed to be deposited with their surfaces lying in or parallel to the plane of the surface being silvered. It will be evident that a perfectly plane reflecting surface would produce a more clear reflected image than will a reflective surface in which the various plates of silver lie on various planes.

Thus, in the practice of this invention, a surface to be silvered will be mechanically cleaned by rubbing with a suspension of rouge in water and then rinsed with distilled or demineralized water. Thereafter, the surface is chemically cleaned by use of a reducing compound of an element found in Group IV-A of the Periodic Chart of which titanium is the most desirable element and titanous chloride and particularly the trichloride is a most desirable compound. It is additionally desirable to include a quantity of stannous chloride in the cleaning solution. Following the cleaning operations, a silver coating may be applied to the glass surface in any conventional manner.

What is claimed is:

1. The method of producing a mirror surface including treating a glass surface with an aqueous solution containing titanous chloride, and depositing a coating of metallic reflectant material on said surface.

2. The method of producing a mirror surface including treating a glass surface with an aqueous solution containing titanous and stannous chlorides, and depositing a coating of metallic reflectant material on said surface.

3. The method according to claim 1 in which the solution containing titanous chloride is provided by approximately 0.0002 gram to 0.2 gram of titanous chloride in solution in 4,000 ml. of water.

4. The method according to claim 2 in which the solution containing the titanous and stannous chlorides is provided by approximately 0.0002 gram to 0.2 gram of titanous chloride and 0.02 gram to 20 grams of stannous chloride in solution in 4,000 ml. of water.

5. The method according to claim 2 in which the weight ratio of titanous chloride to stannous chloride in said solution is approximately 1 to 100.

References Cited in the file of this patent

UNITED STATES PATENTS

| | | |
|---|---|---|
| 2,030,476 | Smith | Feb. 11, 1936 |
| 2,439,654 | Gaiser et al. | Apr. 13, 1948 |
| 2,746,888 | Ross | May 22, 1956 |

FOREIGN PATENTS

| | | |
|---|---|---|
| 635,102 | Great Britain | Apr. 5, 1950 |

OTHER REFERENCES

Mellor's Modern Inorganic Chemistry, 1951, page 748 (revised edition).